US012626460B2

(12) United States Patent　　(10) Patent No.:　US 12,626,460 B2
Zakharov et al.　　　　　　　　(45) Date of Patent:　　May 12, 2026

(54) RECURSIVE FIELD NETWORKS FOR OBJECT REPRESENTATION

(71) Applicant: Toyota Research Institute, Inc., Los Altos, CA (US)

(72) Inventors: Sergey Zakharov, Menlo Park, CA (US); Katherine Y Liu, Mountain View, CA (US); Adrien David Gaidon, San Jose, CA (US); Rares A Ambrus, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 266 days.

(21) Appl. No.: 18/240,920

(22) Filed: Aug. 31, 2023

(65) Prior Publication Data

US 2024/0303923 A1　　Sep. 12, 2024

Related U.S. Application Data

(60) Provisional application No. 63/450,482, filed on Mar. 7, 2023.

(51) Int. Cl.
G06T 17/00　　　(2006.01)
(52) U.S. Cl.
CPC ................................... G06T 17/005 (2013.01)
(58) Field of Classification Search
CPC .......................... G06T 17/005; G06T 2210/36
See application file for complete search history.

(56) References Cited

U.S. PATENT DOCUMENTS

| | | |
|---|---|---|
| 2005/0285858 A1 | 12/2005 | Yang et al. |
| 2015/0262416 A1 | 9/2015 | Hecht |
| 2022/0172423 A1* | 6/2022 | Takikawa .............. G06T 17/005 |
| 2023/0005217 A1* | 1/2023 | Chen ...................... G06N 20/00 |
| 2024/0303908 A1* | 9/2024 | Zhang ...................... G06T 3/40 |

OTHER PUBLICATIONS

Locatello et al.,"Object-Centric Learning with Slot Attention," Oct. 14, 2020, pp. 1-27. (Year: 2020).*
Irshad et al., "ShAPO: Implicit Representation for Multi-Object Appearance, Shape and Pose Optimization", Computer Vision—ECCV2022:17th European Conference, 2022, 23 pages. (Year: 2022).*
Zhou et al., "Thingi 10K: A Dataset of 10,000 3D-Printing Models," Jul. 2, 2016, 8 pages.

(Continued)

*Primary Examiner* — Michael Le
(74) *Attorney, Agent, or Firm* — Christopher G. Darrow; Darrow Mustafa PC

(57)　　　　　　　　ABSTRACT

Systems, methods, and other embodiments described herein relate to using octrees and trilinear interpretation to generate field-specific representations. In one embodiment, a method includes acquiring a latent vector describing an object. The method includes generating an octree from the latent vector according to a recursive network, the octree representing the object at a desired level-of-detail (LoD). The method includes extracting features from the octree at separate resolutions. The method includes providing a field as a representation of the object according to the features.

20 Claims, 4 Drawing Sheets

(56) References Cited

OTHER PUBLICATIONS

Tancik et al., "Learned Initializations for Optimizing Coordinate-Based Neural Representations," Mar. 23, 2021, pp. 1-13.

Tancik et al., "Fourier Features Let Networks Learn High Frequency Functions in Low Dimensional Domains," Jun. 18, 2020, pp. 1-24.

Tang et al., "OctField: Hierarchical Implicit Functions for 3D Modeling," Nov. 1, 2021, pp. 1-13.

Tewari et al., "Advances in Neural Rendering," Mar. 30, 2022, pp. 1-33.

Tremblay et al., "RTMV: A Ray-Traced Multi-View Synthetic Dataset for Novel View Synthesis," Oct. 25, 2022, pp. 1-24.

Wei et al., "NerfingMVS: Guided Optimization of Neural Radiance Fields for Indoor Multi-view Stereo," 2021, 11 pages.

Williams et al., "Neural Fields as Learnable Kernels for 3D Reconstruction," Nov. 26, 2021, 18 pages.

Xian et al., "Space-time Neural Irradiance Fields for Free-Viewpoint Video," Jun. 18, 2021, 12 pages.

Xie et al., "Neural Fields in Visual Computing and Beyond," Apr. 5, 2022, 36 pages, vol. 41, No. 2.

Yang et al., "PointFlow: 3D Point Cloud Generation with Continuous Normalizing Flows," Sep. 2, 2019, 15 pages.

Yu et al., "pixelNeRF: Neural Radiance Fields from One or Few Images," May 30, 2021, 20 pages.

Yu et al., "Unsupervised Discovery of Object Radiance Fields," Mar. 16, 2022, pp. 1-32.

Yuan et al., "STaR: Self-supervised Tracking and Reconstruction of Rigid Objects in Motion with Neural Rendering," Dec. 22, 2020, pp. 1-12.

Zhou et al., "3D Shape Generation and Completion through Point-Voxel Diffusion," Aug. 29, 2021, 23 pages.

Zhang et al., "OPT: Open Pre-trained Transformer Language Models," Jun. 21, 2022, 30 pages.

Zeng et al., "Lion: Latent Point Diffusion Models for 3D Shape Generation," Oct. 12, 2022, pp. 1-63.

Zhang et al., "Nerf++: Analyzing and Improving Neural Radiance Fields," Oct. 21, 2020, pp. 1-9.

Zakharov et al. "Single-Shot Scene Reconstruction", 5th Annual Conference on Robot Learning 2021 (CoRL 2021), 2021, 12 pages.

Zakharov et al., "Autolabeling 3D Objects with Differentiable Rendering of SDF Shape Priors", 2020 IEEE/CVF Conference on Computer Vision and Pattern Recognition (CVPR), 2020, pp. 12224-12233.

Guizilini, et al. "Semantically-Guided Representation Learning for Self-Supervised Monocular Depth", 2020 International Conference on Learning Representations (ICLR 2020), 2019, 14 pages.

Guizilini et al., "3D Packing for Self-Supervised Monocular Depth Estimation", Proceedings of the IEEE/CVF Conference on Computer Vision and Pattern Recognition (CVPR), 2020, pp. 2485-2494.

Zakharov et al., "DPOD: 6D Pose Object Detector and Refiner", 2019 IEEE/CVF International Conference on Computer Vision (ICCV), 2019, pp. 1941-1950.

Park et al., "Pix2Pose: Pixel-Wise Coordinate Regression of Objects for 6D Pose Estimation", 2019 IEEE/CVF International Conference on Computer Vision (ICCV), 2019, pp. 7668-7677.

Li et al., "CDPN: Coordinates-Based Disentangled Pose Network for Real-Time RGB-Based 6-DoF Object Pose Estimation", 2019 IEEE/CVF International Conference on Computer Vision (ICCV), 2019, pp. 7678-7687.

Park et al., "DeepSDF: Learning Continuous Signed Distance Functions for Shape Representation", 2019 IEEE/CVF Conference on Computer Vision and Pattern Recognition (CVPR), 2019, pp. 165-174.

Mescheder, et al., "Occupancy Networks: Learning 3D Reconstruction in Function Space", 2019 IEEE/CVF Conference on Computer Vision and Pattern Recognition (CVPR), 2019, pp. 4460-4470.

Chen et al., "Learning Implicit Fields for Generative Shape Modeling", Proceedings of the IEEE/CVF Conference on Computer Vision and Pattern Recognition (CVPR), 2019, pp. 5939-5948.

Chabra et al., "Deep Local Shapes: Learning Local SDF Priors for Detailed 3D Reconstruction", European Conference on Computer Vision, 2020, pp. 1-26.

Takikawa et al., "Neural Geometric Level of Detail: Real-time Rendering with Implicit 3D Shapes", Proceedings of the IEEE/CVF Conference on Computer Vision and Pattern Recognition, 2021, pp. 11358-11367.

Deng et al., "NASA: Neural Articulated Shape Approximation", Computer Vision—ECCV 2020: 16th European Conference, 2020, 21 pages.

Carion et al., "End-to-End Object Detection with Transformers", Computer Vision—ECCV 2020, 2020, 26 pages.

Irshad et al., "CenterSnap: Single-Shot Multi-Object 3D Shape Reconstruction and Categorical 6D Pose and Size Estimation", 2022 International Conference on Robotics and Automation (ICRA), 2022, 9 pages.

Rshad et al., "ShAPO: Implicit Representation for Multi-Object Appearance, Shape and Pose Optimization", Computer Vision—ECCV 2022: 17th European Conference, 2022, 23 pages.

Zakharov et al., "ROAD: Learning an Implicit Recursive Octree Auto-Decoder to Efficiently Encode 3D Shapes", 6th Annual Conference on Robot Learning, 2022, 16 pages.

Sitzmann et al., "Scene Representation Networks: Continuous 3D-Structure-Aware Neural Scene Representations", 33rd Conference on Neural Information Processing Systems (NeurIPS 2019), 2019, 12 pages.

Mildenhall et al., "NeRF: Representing Scenes as Neural Radiance Fields for View Synthesis", Communications of the ACM, vol. 65, No. 1, 2021, pp. 99-106.

Yu et al., "PlenOctrees for Real-time Rendering of Neural Radiance Fields", IEEE/CVF International Conference on Computer Vision (ICCV), 2021, pp. 5752-5761.

Zakharov et al., "Photo-realistic Neural Domain Randomization", Computer Vision—ECCV 2022: 17th European Conference, 2022, 25 pages.

Barron et al., "Mip-NeRF: Representation for Anti-Aliasing Neural Radiance Fields," 2021, 19 pages.

Bi et al., "Neural Reflectance Fields for Appearance Acquisition," Aug. 16, 2020, pp. 1-11.

Cai et al., "Learning Gradient Fields for Shape Generation," Aug. 18, 2020, pp. 1-33.

Chang et al., "ShapeNet: An Information-Rich 3D Model Repository," Dec. 9, 2015, pp. 1-11.

Chen et al., "TensoRF: Tensorial Radiance Fields," Nov. 29, 2022, pp. 1-33.

Chen et al., "Factor Fields: A Unified Framework for Neural Fields and Beyond," Jul. 27, 2023, 16 pages.

Chen et al., "Learning Implicit Fields for Generative Shape Modeling," Sep. 16, 2019, 10 pages.

Deng et al., "NASA Neural Articulated Shape Approximation," Jul. 21, 2022, pp. 1-21.

Deng et al., "Depth-supervised NeRF: Fewer Views and Faster Training for Free," Apr. 29, 2022, 13 pages.

Deng et al., "Deformed Implicit Field: Modeling 3D Shapes with Learned Dense Correspondence," Mar. 29, 2021, 16 pages.

Downs et al., "Google Scanned Objects: A High-Quality Dataset of 3D Scanned Household Items," Apr. 25, 2022, 8 pages.

Duan et al., "Curriculum DeepSDF," Jul. 16, 2020, pp. 1-17.

Guizilini et al., "Depth Field Networks for Generalizable Multi-view Scene Representation," Jul. 28, 2022, pp. 1-23.

Hodan et al., "BOP: Benchmark for 6D Object Pose Estimation," Aug. 24, 2018, pp. 1-16.

Irshad et al., "ShAPO: Implicit Representations for Multi-Object Shape, Appearance, and Pose Optimization," Jul. 27, 2022, pp. 1-23.

Jang et al., "CodeNeRF: Disentangled Neural Radiance Fields for Object Categories," Sep. 3, 2021, 10 pages.

Kaskman et al., "HomebrewedDB: RGB-D Dataset for 6D Pose Estimation of 3D Objects," Sep. 30, 2019, 10 pages.

Kato et al., "Differentiable Rendering: A Survey," Jul. 31, 2020, pp. 1-20.

Lindell et al., "AutoInt: Automatic Integration for Fast Neural Volume Rendering," May 23, 2021, pp. 1-8.

(56) References Cited

OTHER PUBLICATIONS

Liu et al., "Neural Sparse Voxel Fields," Jan. 6, 2021, pp. 1-22.
Liu et al., "DIST: Rendering Deep Implicit Signed Distance Function with Differentiable Sphere Tracing," Jun. 11, 2020, 20 pages.
Locatello et al., "Object-Centric Learning with Slot Attention," Oct. 14, 2020, pp. 1-27.
Lombardi et al., "Neural Volumes: Learning Dynamic Renderable Volumes from Images," Jun. 18, 2019, pp. 1-14, vol. 38, No. 4, Article 65.
Martin-Brualla et al., "NeRF in the Wild: Neural Radiance Fields for Unconstrained Photo Collections," Jan. 6, 2021, pp. 1-15.
Mescheder et al., "Occupancy Networks: Learning 3D Reconstruction in Function Space," Apr. 30, 2019, 11 pages.
Mildenhall et al., "NeRF: Representing Scenes as Neural Radiance Fields for View Synthesis," Aug. 3, 2020, pp. 1-25.
Mu et al., "A-SDF: Learning Disentangled Signed Distance Functions for Articulated Shape Representation," Apr. 15, 2021, pp. 1-12.
Müller et al., "Instant Neural Graphics Primitives with a Multiresolution Hash Encoding," May 4, 2022, pp. 1-15, vol. 41, No. 4, Article 102.
Neff et al., "DONeRF: Towards Real-Time Rendering of Compact Neural Radiance Fields using Depth Oracle Networks," Jun. 25, 2021, 15 pages, vol. 40, No. 4.
Niemeyer et al., "Giraffe: Representing Scenes as Compositional Generative Neural Feature Fields," Apr. 29, 2021, 12 pages.
Niemeyer et al., "Differentiable Volumetric Rendering: Learning Implicit 3D Representations without 3D Supervision," Mar. 23, 2020, 12 pages.
Ortiz et al., "iSDF: Real-Time Neural Signed Distance Fields for Robot Perception," May 4, 2022, 16 pages.
Ost et al., "Neural Scene Graphs for Dynamic Scenes," Mar. 5, 2021, pp. 1-11.
Palafox et al., "NPMs: Neural Parametric Models for 3D Deformable Shapes," Aug. 5, 2021, 14 pages.
Park et al., "DeepSDF: Learning Continuous Signed Distance Functions for Shape Representation," Jan. 16, 2019, pp. 1-19.
Park et al., "Nerfies: Deformable Neural Radiance Fields," Sep. 10, 2021, 18 pages.
Peng et al., "Convolutional Occupancy Networks," Aug. 1, 2020, pp. 1-17.
Pumarola et al., "D-NeRF: Neural Radiance Fields for Dynamic Scenes," Nov. 27, 2020, pp. 1-10.
Radford et al., "Learning Transferable Visual Models From Natural Language Supervision," Feb. 26, 2021, pp. 1-48.
Raffel et al., "Exploring the Limits of Transfer Learning with a Unified Text-to-Text Transformer," Sep. 19, 2023, pp. 1-67.
Rebain et al., "DeRF: Decomposed Radiance Fields," Nov. 25, 2020, pp. 1-14.
Sajjadi et al., "Object Scene Representation Transformer," Oct. 12, 2022, pp. 1-18.
Sajjadi et al., "Scene Representation Transformer: Geometry-Free Novel View Synthesis Through Set-Latent Scene Representations," Mar. 29, 2022, pp. 1-15.
Sitzmann et al., "MetaSDF: Meta-learning Signed Distance Functions," Jun. 17, 2020, 17 pages.
Sitzmann et al., "Implicit Neural Representations with Periodic Activation Functions," Jun. 17, 2020, 35 pages.
Sitzmann et al., "Scene Representation Networks: Continuous 3D-Structure-Aware Neural Scene Representations," Jan. 28, 2020, 23 pages.
Srinivasan et al., "NeRV: Neural Reflectance and Visibility Fields for Relighting and View Synthesis," Dec. 7, 2020, pp. 1-12.
Stelzner et al., "Decomposing 3D Scenes into Objects via Unsupervised Volume Segmentation," Apr. 2, 2021, pp. 1-15.
Sucar et al., "iMAP: Implicit Mapping and Positioning in Real-Time," Sep. 13, 2021, 10 pages.
Takikawa et al., "Variable Bitrate Neural Fields," Jun. 15, 2022, pp. 1-10.

* cited by examiner

RECURSIVE FIELD NETWORKS FOR OBJECT REPRESENTATION

CROSS-REFERENCE TO RELATED APPLICATIONS

This application claims benefit of U.S. Provisional Application No. 63/450,482, filed on, Mar. 7, 2023, which is herein incorporated by reference in its entirety.

TECHNICAL FIELD

The subject matter described herein relates, in general, to representing objects and, more particularly, to using octrees and trilinear interpretation to generate field-specific representations.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. In further examples, additional/alternative sensors such as cameras may be implemented to acquire information about the surrounding environment from which a system derives awareness about aspects of the surrounding environment. This sensor data can be useful in various circumstances for improving perceptions of the surrounding environment so that systems such as autonomous driving systems can perceive the noted aspects and accurately plan and navigate accordingly.

In some instances, a system may subsequently represent the perceived objects in various contexts, such as renderings to a driver, within a simulation, and so on. However, accurately representing objects presents a complex task. For example, encoding shapes using neural architectures may be limited to 3D structure for which training can be especially complex. Thus, such an approach generally loses detail.

SUMMARY

In one embodiment, example systems and methods relate to a manner of improving 3D object representation and reconstruction.

In one embodiment, a modeling system is disclosed. The modeling system includes one or more processors and a memory communicably coupled to the one or more processors. The memory stores instructions that, when executed by the one or more processors, cause the one or more processors to acquire a latent vector describing an object. The instructions include instructions to generate an octree from the latent vector according to a recursive network, the octree representing the object at a desired level-of-detail (LoD). The instructions include instructions to extract features from the octree at separate resolutions. The instructions include instructions to provide a field as a representation of the object according to the features.

In one embodiment, a non-transitory computer-readable medium including instructions that, when executed by one or more processors, cause the one or more processors to perform one or more functions is disclosed. The instructions include instructions to acquire a latent vector describing an object. The instructions include instructions to generate an octree from the latent vector according to a recursive network, the octree representing the object at a desired level-of-detail (LoD). The instructions include instructions to extract features from the octree at separate resolutions. The instructions include instructions to provide a field as a representation of the object according to the features.

In one embodiment, a method is disclosed. In one embodiment, the method includes acquiring a latent vector describing an object. The method includes generating an octree from the latent vector according to a recursive network, the octree representing the object at a desired level-of-detail (LoD). The method includes extracting features from the octree at separate resolutions. The method includes providing a field as a representation of the object according to the features.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving 3D object representation and reconstruction are disclosed herein. As previously described, accurately representing 3D objects in an efficient manner is a complex task. For example, neural fields (e.g., neural radiance fields (NeRF)) are neural networks that encode scene properties at arbitrary resolutions. Modeling high-frequency details using NeRFs generally involves embedding low-dimensional inputs into higher dimensional spaces, as well as various approaches of conditioning the neural network during the decoding stage. That is, global conditioning provides for learning latent spaces over large numbers of shapes but uses ground-truth 3D supervision, which is costly, and suffers when representing high-frequency details. Moreover, locally-conditioned approaches partition the implicit function by leveraging hybrid discrete-continuous neural scene representations that blur the line between classical data structures and neural representations. Yet, such approaches are generally constrained by the use of secondary data structures that utilize a greater memory footprint and are generally limited to single scenes.

Therefore, in one or more approaches, an inventive system implements a differentiable representation that captures a large number of objects and scenes without sacrificing accuracy, and without incurring a high memory cost. For example, in one aspect, the inventive system employs a recursive autodecoder to generate an octree that represents an object at multiple different levels-of-detail (LoDs). Accordingly, the system acquires a latent vector representing a particular object. The autodecoder may then iterate over the latent vector by subdividing each node into child-nodes (e.g., eight further nodes). These child nodes can be decoding into occupancy values and pruned if not occupied. The system iteratively performs this process until reaching a defined level-of-detail (LoD). Each separate iteration over the derived octree represents a subsequent LoD. Accordingly, the system outputs the octree and then proceeds to generate a further representation in the form of a NeRF, a signed distance field (SDF), or another field representation.

Thus, the system proceeds by extracting features from the octree using trilinear interpolation. In general, the system samples the octree at separate voxels and interpolates the features across the LoDs using trilinear interpolation. Subsequently, the features are concatenated from the different LoDs and decoded into the field representation. The system then uses the field to, for example, render the object within a scene that is displayed, use within a simulation, etc. In this way, the disclosed system improves the representation of 3D objects in an efficient form that overcomes the noted difficulties.

Figure 1:
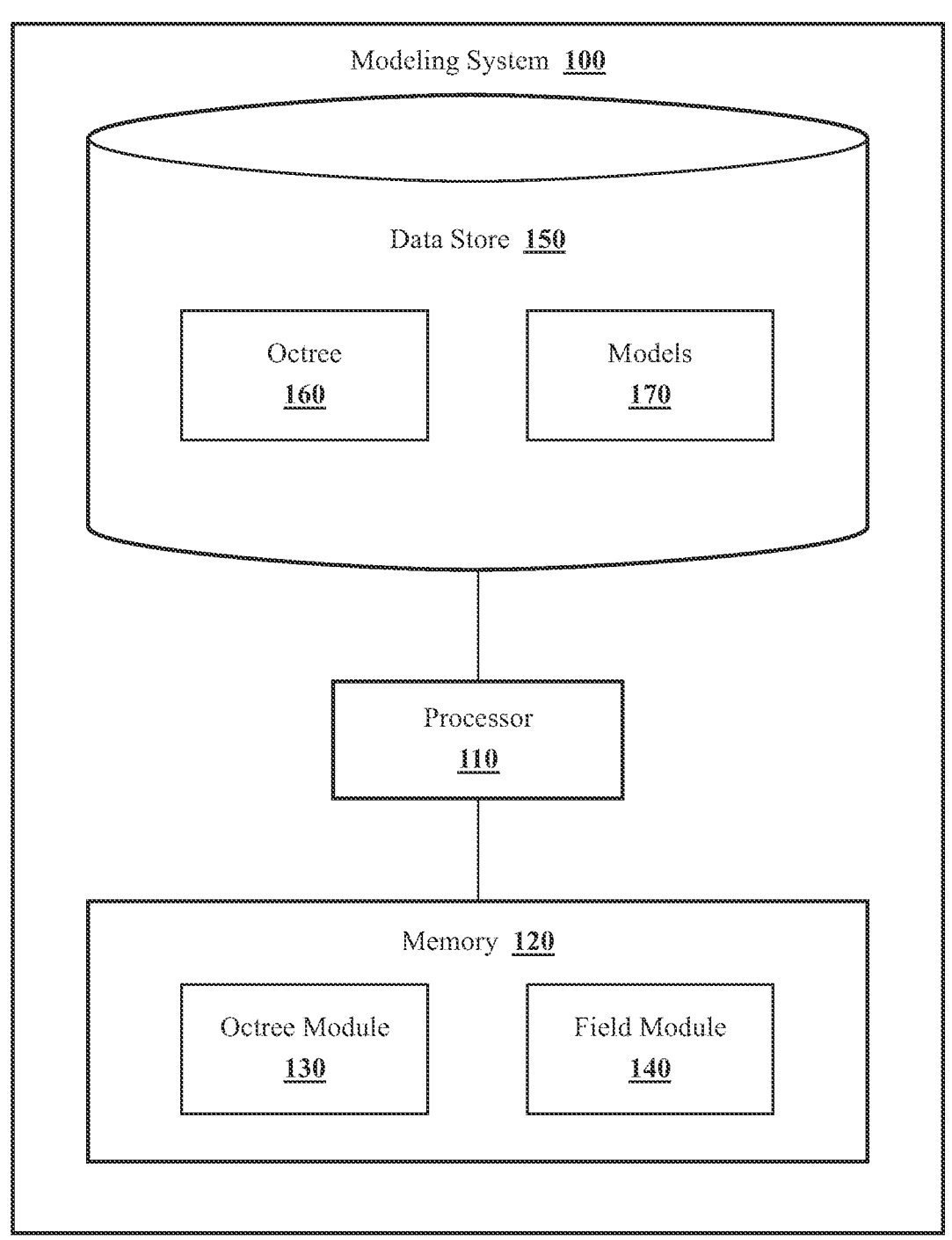
FIG. 1 illustrates one embodiment of a modeling system that is associated with using octrees and trilinear interpolation to generate field-specific representations.

With reference to FIG. 1, one embodiment of a modeling system 100 is illustrated. In various embodiments, the modeling system 100 is implemented as a cloud-based service, a local computer, within a mobile system (e.g., within a vehicle), or within another computing platform. For example, in one approach, functionality associated with at least one module of the modeling system 100 is implemented within a local computing device while further functionality is implemented within a cloud-based computing system. Thus, the modeling system 100 may include a local instance and a remote instance that functions within the cloud-based environment. In further implementations, the modeling system 100 is contained within a single device as opposed to being distributed.

Moreover, the modeling system 100, as provided for herein, may function in cooperation with one or more additional systems, such as a communication system, a display system, a rendering system, a simulation system, and so on. Accordingly, the modeling system 100, in one or more embodiments, functions in combination with other systems to generate outputs that realize advantages of the disclosed systems and methods, such as improved display of graphics representing objects, improved representations in simulations that improve the efficiency of the simulations, improved display within a vehicle, such as within an augmented reality environment, and so on.

The modeling system 100 is shown as including a processor 110. Accordingly, the processor 110 may be a part of the modeling system 100, or the modeling system 100 may access the processor 110 through a data bus or another communication path that is separate from the system 100. In one embodiment, the modeling system 100 includes a memory 120 that stores an octree module 130 and a field module 140. The memory 120 is a random-access memory (RAM), read-only memory (ROM), a hard-disk drive, a flash memory, or another memory that stores the modules 130 and 140. The modules 130 and 140 are, for example, computer-readable instructions that, when executed by the processor 110, cause the processor 110 to perform the various functions disclosed herein. In alternative arrangements, the modules 130 and 140 are independent elements from the memory 120 that are, for example, comprised of hardware elements. Thus, the modules 130 and 140 are alternatively ASICs, hardware-based controllers, a composition of logic gates, or another hardware-based solution. As noted previously, the modeling system 100 as illustrated in FIG. 1 is generally an abstracted form of the modeling system 100 as may be distributed between various locations within a cloud-computing environment. In one or more approaches, the cloud environment may facilitate communications between multiple different devices to acquire and distribute information for processing and representation by the system 100.

Moreover, in one embodiment, the modeling system 100 includes the data store 150. The data store 150 is, in one embodiment, an electronic data structure stored in the memory 120 or another data storage device and that is configured with routines that can be executed by the processor 110 for analyzing stored data, providing stored data, organizing stored data, and so on. Thus, in one embodiment, the data store 150 stores data used by the modules 130 and 140 in executing various functions. In one embodiment, the data store 150 stores the octree(s) 160, one or more models 170 along with, for example, other data used by the modeling system 100.

Accordingly, in at least one configuration, the modeling system 100 implements a novel implicit representation parameterized by a recursive function that efficiently combines global and local conditioning, thereby allowing continuous spatial interpolation and multi-scale aggregation. Moreover, because the modeling system 100 implements a recursive formulation, the system 100 scales to multiple 3D assets represented as fields without maintaining auxiliary data structures, leading to a compact and efficient network structure. Lastly, the modeling system 100 supports multiple different 3D geometries and color representations, which are facilitated by the noted framework.

The octree module 130 functions to represent a set of objects $O=\{O_1, \ldots, O_k\}$. In particular, the modeling system 100 ultimately represents objects as fields, where each object is a mapping from a 3D coordinate in space to a value of dimension F, i.e., $O_k: \mathbb{R}^3 \rightarrow \mathbb{R}^F$. Examples of fields are signed distance fields (where F=1 and the value of the field indicates the distance to the nearest surface) and radiance fields (where F=4 and the field represents RGB and density values). The present approach generally assumes that for each object supervision in the form of $N_k$ coordinate and field value tuples $$D_k = \{x_j, f_j\}_{j=0}^{N_k},$$

where $x \in \mathbb{R}^3$ and $f \in \mathbb{R}^F$ is the field value.

The modeling system 100 represents each shape with a D-dimensional latent vector that the octree module 130 recursively expands into an octree 160 with a maximum level-of-detail (LoD) M that may be predefined according to, for example, a request. The separate levels of the octree 160 correspond to separate feature volumes. The octree module 130 implements, as one of the models 170, a recursive autodecoder that functions to expand the octree 160 when given a latent vector associated with an object. The field module 140 includes instructions to then use the octree to interpolate feature volumes at different LoDs to obtain field values at arbitrary coordinates for, for example, rendering. Accordingly, given a latent vector $z^m \in \mathbb{R}^D$ from LoD m, the recursive autodecoder network $\varphi$: $\mathbb{R}^D \to \mathbb{R}^{8D}$ functions to traverse the octree 160 using latent subdivision as expressed in equation (1).

$$\phi(z^m) \to \left(z_i^{m+1}\right)_{i=1}^{8} \qquad (1)$$

Thus, the latent vector, or a child latent node for subsequent divisions, is divided into eight cells/nodes within the octree 160. Each division is associated with a child latent vector that is positioned at the center of the cell. The octree module 130 may decode the child latents into occupancy values "o" using one of the models 170. In particular, the octree module 130 may decode the child latents using a network $\psi$: $\mathbb{R}^D \to \mathbb{R}^1$ that prunes voxels not containing any geometry. To obtain the occupancy value of cells at a particular LoD, the octree module 130 implements a recursive formulation provided by equation (2), where the ellipsis denotes recursive execution m times.

$$w\left(\phi\left( \ldots \left(\phi\left(z^0\right)\right)\right)\right) = \{o^m\} \qquad (2)$$

In one embodiment, to supervise occupancy predictions, the modeling system 100 further assumes access to the structure of the ground-truth octree during training, i.e., annotations of which voxels at separate LoDs are occupied. The octree module 130, in at least one configuration, then prunes voxels that are predicted to be more likely unoccupied than occupied. Thus, the octree 160 represents the object described by the latent vector at a defined LoD m according to a number of iterations over the octree by the recursive autodecoder. The modeling system 100 may represent the octree 160 as a tensor of bytes where each bit represents the binary occupancy sorted in Morton order and enables efficient tree access.

Once the modeling system 100 generates the octree 160 for an object, the field module 140 can decode the octree 160 into various outputs depending on the desired parameterization. For example, in one approach, the field module 140 approximates latents at sampled locations using trilinear interpolation given spatially surrounding latents at the same LoD, as determined from the octree 160. Additionally, to provide for hierarchical global-to-local feature aggregation, the field module 140 aggregates information across the octree 160. In one approach, the field module 140 repeats the spatial trilinear interpolation for latents at every LoD except the first, and then fuses resulting intermediate latents/features into a new latent $\bar{z} \in \mathbb{R}^{\bar{D}}$, where the dimension $\bar{D}$ of the fused latent varies based on whether a concatenation or summation scheme is used.

The field module 140 uses the octree 160 to generate representations of the object in various field representations. In one approach, the field module 140 decodes the voxel centers represented by the nodes of the octree 160 into field values. Alternatively, the field module 140 can use the octree 160 to perform volumetric rendering. For example, the field module 140 can estimate axis-aligned bounding-box (AABB) intersections with voxels at a highest LoD. Given the enter and exit points for each voxel, the field module 140 then samples points within the voxel volume, and renders the object via, for example, sphere ray tracing and volumetric compositing.

In general, the field module 140 may output one or more representations of the object by employing different types of field representations and/or rendering techniques. In particular, the field module 140 regresses field-specific signals via neural mappings that map regressed latents, and optionally, viewing direction to the desired output, such as signed distance fields (SDF) and RGB or density and RGB, Neural Radiance Fields, etc. In general, the following discussion denotes the neural mapping responsible for geometry as y and the neural mapping responsible for appearance as $\xi$.

In the context of SDF, the field module 140 applies the network $\psi$: $\mathbb{R}^D \to \mathbb{R}^1$ to the fused latent vector that is regressed via spatial interpolation over the octree 160 and fused over multiple LoDs to estimate an SDF value s corresponding to a distance to the closest surface, with positive and negative values representing exterior and interior areas, respectively. The network $\xi$: $\mathbb{R}^D \to \mathbb{R}^3$ estimates a 3D vector c=(r, g, b) that represents RGB colors. To extract points on the surface of the object, the field module 140 decodes $\sigma$ for the coordinate of each occupied voxel at the highest LoD available and calculates the normal of point by taking the derivative with reference to the spatial coordinates. For example, given XYZ coordinates, SDF values, and respective surface normal, the modeling system 100 projects given points onto the surface of the object via zero-isosurface projection. The field module 140 may further render the encoded object via sphere ray tracing by, at each step, querying the SDF value within the voxels that defines a sphere radius for a next step. Alternatively, the field module 140 uses sphere ray tracing to render the object or extract a surface of the object. The field module 140 may repeat this process until reaching the surface. The latents at the surface points are then used to estimate color values.

In the context of NeRF, the field module 140 uses the networks $\xi$: $\mathbb{R}^{D+3} \to \mathbb{R}^3$ and $\psi$: $\mathbb{R}^D \to \mathbb{R}^1$ to accept the fused multiscale features to estimate a 4D vector (c, $\sigma$), where c=(r, g, b) are RGB colors and o are densities per point. The color network additionally takes a 3-channel view direction vector d and the corresponding annotation D is augmented accordingly. When the field module 140 renders the object, the module 140 composites K color predictions along the view ray via equation (3).

$$\hat{c}_{ij} = \sum_{k=1}^{K} w_k \hat{c}_k \qquad (3)$$

where weights $w_k$ and accumulated densities $T_k$, provided intervals $\delta_k = t_{k+1} - t_k$ are defined according to equations (3) and (4).

$$w_k = T_k(1 - \exp(-\sigma_k \delta_k)) \qquad (3)$$

$$T_k = \exp\left(-\sum_{k=1}^{K} \sigma_k \cdot \delta_k\right) \qquad (4)$$

$$\{t_k\}_{k=0}^{K-1}$$

are sampled adaptive depth values. Accordingly, the modeling system 100 implements the octree 160 and decodes the octree 160 into the field representation to more efficiently represent the encoded objects.

Figure 2:
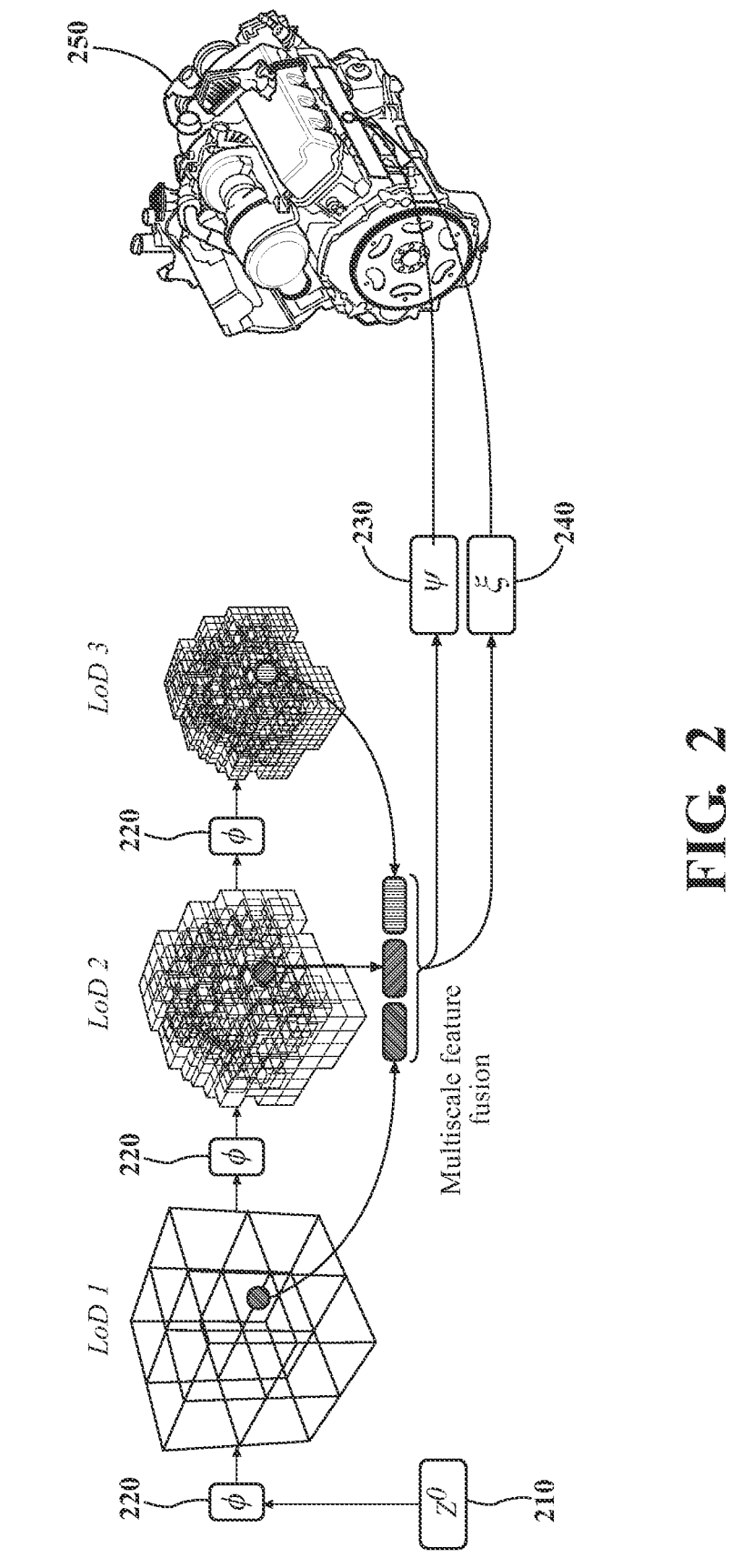
FIG. 2 illustrates one example of modeling an object using an octree representing multiple different levels-of-detail.

With reference to the FIG. 2 and the models 170, one example 200 of an octree and using the models 170 to generate the octree and reconstruct an object is shown. As an initial note about the models 170, in one or more arrangements, the models 170 are multi-layer perceptions (MLPs) or similar machine-learning algorithms that provide for implementing the functions described herein. In the illustrated example 200, the modeling system 100 initially acquires a latent vector 210 for an object. The recursive autodecoder 220, represented as $\phi$, uses an implicit recursive hierarchical representation and a combination of spatial and global-to-local feature fusion to accurately reconstruct 3D assets. The autodecoder 220 acquires the latent vector 210 representing a single input feature corresponding to LoD 0. The autodecoder 220 recursively expands an octree to a defined LoD using latent subdivision. As noted previously, the octree module 130 prunes unoccupied voxels at each LoD. As shown in the example 200, the autodecoder 220 performs the latent subdivision task for three separate iterations to generate the octree with a LoD 3, which represents a defined LoD m for the task.

The field module 140 performs trilinear interpolation to obtain feature values at sampled spatial coordinates. Specifically, the field module 140 performs the trilinear interpolation within each separate LoD and then aggregates/concatenates the features via, for example, multiscale feature fusion. Lastly, the field module 140 applies the color network 240 and geometry network 230 to decode color and geometry for a desired coordinate. Ultimately, the field module 140 generates a reconstructed object 250 from the octree 160 using the models 170. Thus, the field module 140 can query coordinates within bounds of an object in order to apply, for example, differentiable rendering to reconstruct an object.

Figure 3:
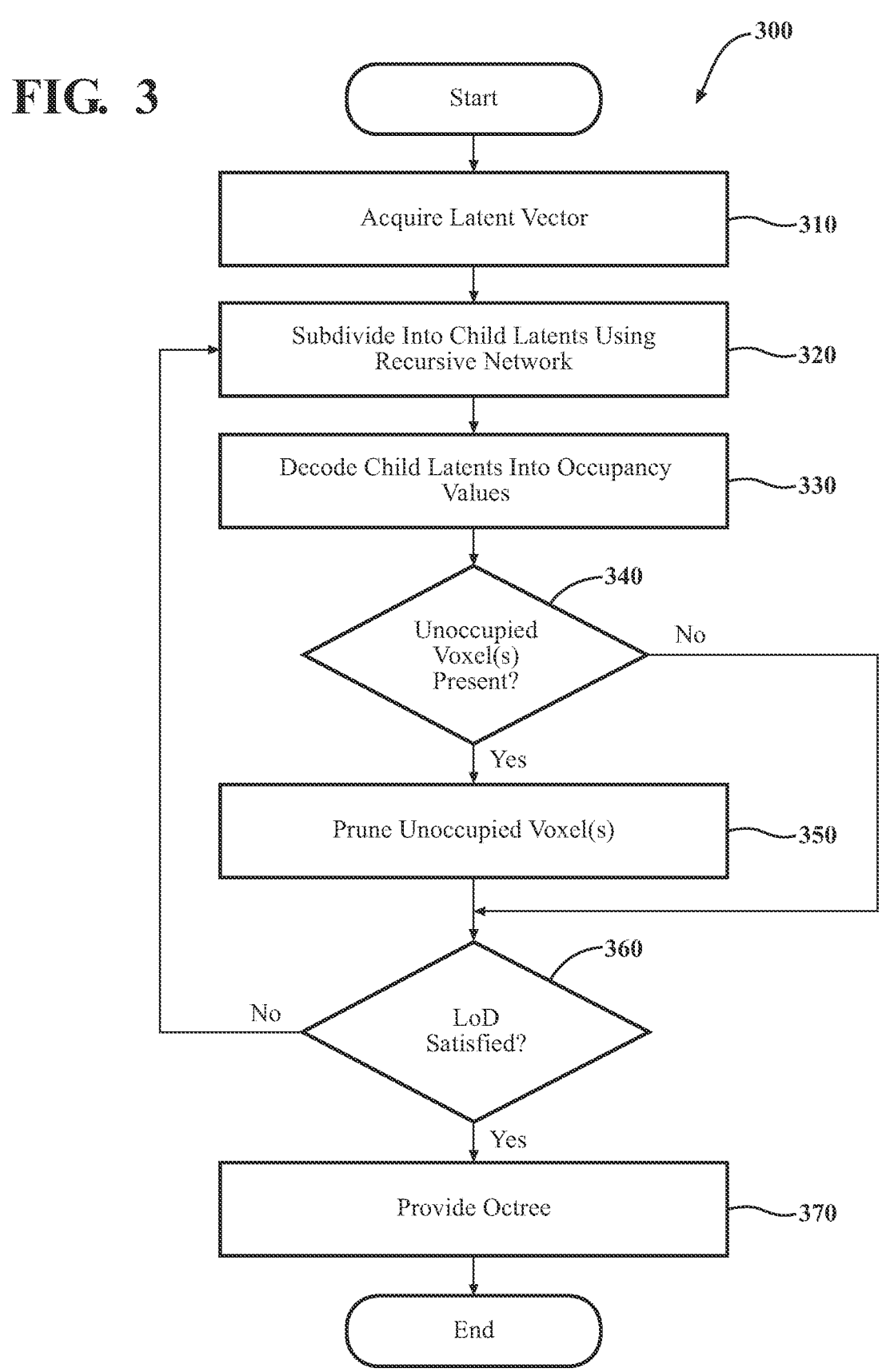
FIG. 3 illustrates a flowchart for one embodiment of a method that is associated with generating an octree from a latent vector.

FIG. 3 illustrates a flowchart of a method 300 that is associated with generating an octree from a latent vector. Method 300 will be discussed from the perspective of the modeling system 100. While method 300 is discussed in combination with the modeling system 100, it should be appreciated that the method 300 is not limited to being implemented within the modeling system 100 but is instead one example of a system that may implement the method 300.

At 310, the octree module 130 acquires a latent vector describing an object. In one embodiment, the octree module 130 acquires the latent vector as a request to provide the object as a field representation. In one approach, the request may be for rendering the object for display. For example, the modeling system 100 can function to render scenes for various purposes, such as in-vehicle augmented reality (AR) that includes displaying alerts, rendering simulations, and so on. The latent vector is, for example, an abstract representation of the object that is interpretable by a machine-learning algorithm trained on an associated latent space defining aspects of a set of objects. In general, the latent vector is comprised of a series of separate values that encode information for the algorithm to represent geometry, color, and so on. It should be appreciated that the latent space to which the latent vector belongs may represent a broad set of objects and thus aspects (e.g., components, coloring, etc.) of the latent vector may be shared between some of the objects represented in the latent space.

At 320-360, the octree module 130 generates the octree 160 from the latent vector according to a recursive network (i.e., the recursive autodecoder $\phi$). The octree represents the object at a desired level-of-detail (LoD) through a process that iteratively expands the latent vector through the various LoDs using the network, as described at 320-360.

At 320, the octree module 130 subdivides the latent vector or child latents (i.e., nodes of the octree 160) into additional child nodes, which depends on whether the latent vector has been previously subdivided to initially create the octree 160 or whether the method is already at a subsequent LoD in the process. In general, the octree module 130 subdivides each node into eight additional child nodes depending from the original to form a tree structure with eight dependent child nodes.

At 330, the octree module 130 decodes the child latents into occupancy values using one of the models 170 (e.g., $\psi$). The resulting decoding latent values specify whether the location associated with the child node is occupied or not and may further include other information, such as latent vector information about color, geometry, etc.

At 340, the octree module 130 analyzes the separate child latents/nodes from subdividing and decoding to determine whether the voxels represented by the child latents are occupied or not. In one configuration, the octree module 130 reviews values of the child latents and when one or more are unoccupied proceeds to pruning at block 350. Otherwise, the octree module 130 proceeds to determine whether an additional iteration is to be undertaken at block 360.

At 350, the octree 130 prunes unoccupied voxels/child latents. In one approach, the octree module 130 deletes or otherwise removes the voxels when unoccupied while preserving occupied voxels. In this way, the modeling system 100 limits memory consumption by avoiding representing unoccupied space within the octree 160.

At 360, the octree module 130 determines whether the octree 160 has reached a defined level-of-detail (LoD). That is, the octree module 130 iteratively applies the recursive autodecoder to divide the octree 160 until iterating over the octree 160 a sufficient number of times to reach the defined LoD. In general, each separate iteration over the octree 160 advances the LoD by another level.

At 370, the octree module 130 provides the octree 160 for subsequent use in generating the field representation. It should be noted that the octree 160 enables the subsequent field representation by providing an efficient abstract representation of the object. The octree 160, in general, is a recursive hierarchical representation that integrates representations of the object at multiple different LoDs. This format of representing the object provides an efficient mechanism for subsequently generating the object in different schemes.

Figure 4:
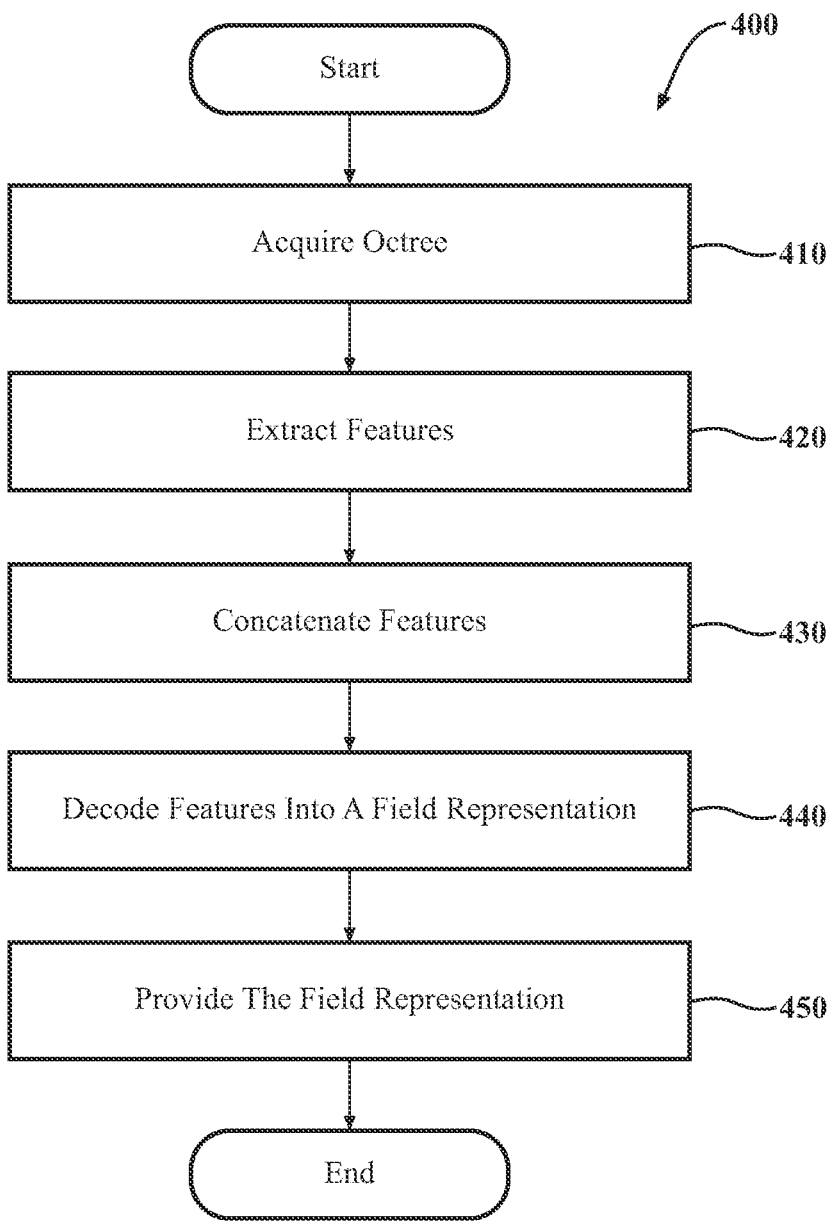
FIG. 4 illustrates a flowchart for one embodiment of a method that is associated with applying trilinear interpolation to features of an octree to generate a field-specific representation.

FIG. 4 illustrates a flowchart of a method 400 that is associated with generate a field-specific representation. Method 400 will be discussed from the perspective of the modeling system 100. While method 400 is discussed in combination with the modeling system 100, it should be appreciated that the method 400 is not limited to being implemented within the modeling system 100 but is instead one example of a system that may implement the method 400.

At 410, the field module 140 acquires the octree 160. In one approach, the field module 140 receives the octree 160 responsive to the octree module 130 completing the method 300. In further approaches, the field module 140 acquires the octree 160 as part of a request to generate a field representation of the object. In either case, once acquired, the field module 140 initiates subsequent functions as discussed at blocks 420-450.

At 420, the field module 140 extracts features from the octree 160 at separate resolutions. In one approach, the field module 140 extracts the features using trilinear interpolation among neighboring latents in the octree 160. For example, to resolve features the field module 140 uses trilinear interpolation to reconcile values of neighboring voxels between separate LoDs, thereby retaining information across the LoDs and improving the ultimate quality of the features.

At 430, the field module 140 concatenates the features across separate LoDs at separate voxels. That is, to incorporate the available information from the separate LoDs as previously interpolated, the field module 140 combines the features through concatenating the features.

At 440, the field module 140 decodes the features into the field representation. As previously noted, the field module 140 may employ one or more additional networks to decode the geometry and the color into a particular field format, such as SDF, NeRF, etc.

At 450, the field module 140 provides a field as a representation of the object according to the features. That is, the field module 140 can electronically output the generated field via an electronic communication to another computing device or by using the field to further generate additional representations, such as a visible display of the object. For example, in one approach, the modeling system 100 generates a visual display of the object from a desired viewpoint according to volumetric rendering or another rendering approach. In this way, the modeling system 100 realizes improvements of the octree and field representations, including the particular process of generating the field representation using the octree.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, an electronic, magnetic, optical, electromagnetic, infrared, or semiconductor system, apparatus, or device, or a combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A modeling system, comprising:

one or more processors;

a memory communicably coupled to the one or more processors and storing instructions that, when executed by the one or more processors, cause the one or more processors to:

acquire a latent vector describing an object;

generate an octree from the latent vector according to a recursive network, the octree representing the object at a desired level-of-detail (LoD), including instructions to prune unoccupied voxels as the recursive network expands existing latent nodes according to a prediction of a likelihood of being occupied;

extract features from the octree at separate resolutions; and provide a field as a representation of the object according to the features.

2. The modeling system of claim 1, wherein the instructions to extract the features include instructions to using trilinear interpolation among neighboring latents in the octree at separate LoDs to estimate the features.

3. The modeling system of claim 1, wherein the instructions further include instructions to:

concatenate the features across separate LoDs at separate voxels; and decode the features into the field.

4. The modeling system of claim 1, wherein the instructions to acquire the latent vector include instructions to receive the latent vector as a request to generate the field, and wherein the octree is a recursive hierarchical representation that integrates representations of the object at multiple different LoDs.

5. The modeling system of claim 1, wherein the instructions to generate the octree according to the recursive network include instructions to apply a recursive autodecoder to iteratively divide the octree until reaching a defined LoD.

6. The modeling system of claim 1, wherein the latent vector is an abstract representation of the object that is interpretable by a machine-learning algorithm trained on an associated latent space defining aspects of a set of objects.

7. The modeling system of claim 1, wherein the instructions to provide the field include instructions to provide the field as one of: a neural radiance field (NeRF), and a signed distance field (SDF).

8. The modeling system of claim 7, wherein the instructions to provide the field include instructions to render the object using the field as a portion of a display.

9. A non-transitory computer-readable medium including instructions that when executed by one or more processors cause the one or more processors to:

acquire a latent vector describing an object;

generate an octree from the latent vector according to a recursive network, the octree representing the object at a desired level-of-detail (LoD), including instructions to prune unoccupied voxels as the recursive network expands existing latent nodes according to a prediction of a likelihood of being occupied;

extract features from the octree at separate resolutions; and provide a field as a representation of the object according to the features.

10. The non-transitory computer-readable medium of claim 9, wherein the instructions to extract the features include instructions to using trilinear interpolation among neighboring latents in the octree at separate LoDs to estimate the features.

11. The non-transitory computer-readable medium of claim 9, wherein the instructions further include instructions to:

concatenate the features across separate LoDs at separate voxels; and decode the features into the field.

12. The non-transitory computer-readable medium of claim 9, wherein the instructions to acquire the latent vector include instructions to receive the latent vector as a request to generate the field, and wherein the octree is a recursive hierarchical representation that integrates representations of the object at multiple different LoDs.

13. The non-transitory computer-readable medium of claim 9, wherein the instructions to generate the octree according to the recursive network include instructions to apply a recursive autodecoder to iteratively divide the octree until reaching a defined LoD.

14. A method, comprising:

acquiring a latent vector describing an object;

generating an octree from the latent vector according to a recursive network, the octree representing the object at a desired level-of-detail (LoD), wherein generating the octree includes pruning unoccupied voxels as the recursive network expands existing latent nodes according to a prediction of a likelihood of being occupied;

extracting features from the octree at separate resolutions; and providing a field as a representation of the object according to the features.

15. The method of claim 14, wherein extracting the features includes using trilinear interpolation among neighboring latents in the octree at separate LoDs to estimate the features, including sampling the features at different LoDs.

16. The method of claim 14, further comprising:

concatenating the features across separate LoDs at separate voxels; and decoding the features into the field.

17. The method of claim 14, wherein acquiring the latent vector includes receiving the latent vector as a request to generate the field, and wherein the octree is a recursive hierarchical representation that integrates representations of the object at multiple different LoDs.

18. The method of claim 14, wherein generating the octree according to the recursive network includes applying a recursive autodecoder to iteratively divide the octree until reaching a defined LoD.

19. The method of claim 14, wherein the latent vector is an abstract representation of the object that is interpretable by a machine-learning algorithm trained on an associated latent space defining aspects of a set of objects.

20. The method of claim 14, wherein providing the field includes providing the field as one of: a neural radiance field (NeRF), and a signed distance field (SDF), and wherein providing the field includes rendering the object using the field as a portion of a display.

* * * * *